US005611947A

United States Patent [19]

Vavruska

[11] Patent Number: 5,611,947

[45] Date of Patent: Mar. 18, 1997

[54] INDUCTION STEAM PLASMA TORCH FOR GENERATING A STEAM PLASMA FOR TREATING A FEED SLURRY

[75] Inventor: John S. Vavruska, Santa Fe, N.M.

[73] Assignees: Alliant Techsystems, Inc., Hopkins, Minn.; Plasma Technology, Inc., Santa Fe, N.M.

[21] Appl. No.: 302,048

[22] Filed: Sep. 7, 1994

[51] Int. Cl.$^6$ .................................................... B23K 10/00

[52] U.S. Cl. ............................... 219/121.52; 219/121.37; 219/121.38; 219/121.59; 219/121.36; 588/901; 110/243; 110/250; 110/238; 110/346

[58] Field of Search ......................... 219/121.37, 121.36, 219/121.38, 121.59, 121.48, 121.43, 121.52; 588/901; 110/242–250, 346, 236–238

[56] References Cited

U.S. PATENT DOCUMENTS

| | | |
|---|---|---|
| 4,326,842 | 4/1982 | Adachi et al. . |
| 4,341,915 | 7/1982 | Adachi et al. . |
| 4,390,772 | 6/1983 | Hiratake . |
| 4,431,901 | 2/1984 | Hull . |
| 4,432,942 | 2/1984 | Adachi et al. . |
| 4,438,706 | 3/1984 | Boday et al. . |
| 4,479,443 | 10/1984 | Faldt et al. . |
| 4,508,040 | 4/1985 | Santen et al. . |
| 4,615,285 | 10/1986 | Bentell et al. . |
| 4,631,384 | 12/1986 | Cornu . |
| 4,644,877 | 1/1987 | Barton et al. . |
| 4,727,236 | 2/1988 | Hull et al. . |
| 4,766,351 | 8/1988 | Hull et al. . |
| 4,770,109 | 9/1988 | Schlienger . |
| 4,823,711 | 4/1989 | Kroneberger et al. . |
| 4,831,944 | 5/1989 | Durand et al. . |
| 4,883,570 | 11/1989 | Efthimion et al. . |
| 4,886,001 | 12/1989 | Chang et al. . |
| 4,896,614 | 1/1990 | Kulkarni . |
| 4,909,164 | 3/1990 | Shohet et al. . |
| 4,912,296 | 3/1990 | Schlienger . |
| 4,919,190 | 4/1990 | Newman et al. . |
| 4,960,380 | 10/1990 | Cheetham . |
| 4,980,092 | 12/1990 | Pineau et al. . |
| 5,026,464 | 6/1991 | Mizuno et al. . |
| 5,065,680 | 11/1991 | Cheetham . |
| 5,090,340 | 2/1992 | Burgess . |
| 5,095,828 | 3/1992 | Holden et al. . |
| 5,108,718 | 4/1992 | Dummersdorf et al. . |
| 5,123,362 | 6/1992 | Kikuchi . |
| 5,134,946 | 8/1992 | Poovey . |

(List continued on next page.)

FOREIGN PATENT DOCUMENTS

| | | |
|---|---|---|
| 2201720 | 1/1972 | European Pat. Off. . |
| 0290974 | 11/1988 | European Pat. Off. . |
| 0391748 | 10/1990 | European Pat. Off. . |
| 0426926 | 5/1991 | European Pat. Off. . |
| 289402 | 12/1989 | Germany . |
| 4042028 | 12/1990 | Germany . |
| 6211320 | 3/1978 | Japan . |
| 4279179 | 2/1991 | Japan . |
| 4341792 | 5/1991 | Japan . |
| 2113815 | 7/1982 | United Kingdom . |
| 2152949 | 6/1984 | United Kingdom . |
| 8200509 | 7/1981 | WIPO . |
| 9111658 | 1/1991 | WIPO . |

OTHER PUBLICATIONS

"EPA to Evaluate New Technologies for Cleaning Up Hazardous Waste", May 25, 1987, C & EN—Magazine Article.

*Primary Examiner*—Mark H. Paschall
*Attorney, Agent, or Firm*—Hugh D. Jaeger

[57] ABSTRACT

Steam plasma reactor incorporating an induction steam plasma torch where superheated steam is generated and passed through an induction coil or coils to generate high temperature steam plasma for conversion and disposal of waste products such as low level radioactive waste, energetics, such as solid rocket propellants, liquid rocket fuel, chemical agents such as nerve gas, industrial waste such as paint sludge, hazardous chemical waste, medical waste and other general wastes in a downstream conversion reactor referred to as a plasma energy recycle and conversion (PERC) reactor.

20 Claims, 8 Drawing Sheets

U.S. PATENT DOCUMENTS

| | | | |
|---|---|---|---|
| 5,138,959 | 8/1992 | Kulkarni . | |
| 5,200,595 | 4/1993 | Boulos et al. . | |
| 5,204,506 | 4/1993 | Asmus et al. . | |
| 5,206,879 | 4/1993 | Moody et al. . | |
| 5,256,854 | 10/1993 | Bromberg et al. . | |
| 5,270,515 | 12/1993 | Long . | |
| 5,276,297 | 1/1994 | Nara . | |
| 5,288,969 | 2/1994 | Wong et al. . | |
| 5,310,411 | 5/1994 | Tognazzo | 48/62 R |

INDUCTION STEAM PLASMA TORCH FOR GENERATING A STEAM PLASMA FOR TREATING A FEED SLURRY

BACKGROUND OF THE INVENTION

1. Field of the Invention

The present invention is for a plasma energy recycling and conversion (PERC) reactor, and more particularly, relates to a steam plasma torch in use with a PERC reactor.

2. Description of the Prior Art

Prior art plasma torches such as argon fired plasma torches include relatively low power efficiencies ranging from about 10% to 30% overall efficiency. Cooling water draws a great deal of heat from the area immediately surrounding the torch and is generally dumped overboard with little or no regard to recovery of heat from the cooling water. Other considerations of prior art plasma torches are the cost of gases such as argon which is a costly factor in the firing of plasma torches.

Clearly what is needed is an economically feasible steam plasma torch reactor having a high degree of thermal energy recovery. The present invention provides such a device where economically feasible superheated dry steam is generated and incorporated to produce an induction steam plasma torch heat source.

SUMMARY OF THE INVENTION

The general purpose of the present invention is a steam plasma reactor. An induction coupled plasma torch having a water jacket surrounding the plasma zone and a hollow metal shroud down stream of the plasma zone operates as a steam generator. This concept serves the dual purpose of: a) recovering a potentially substantial fraction of plasma heat that would normally be lost as low temperature heat to a large flow of cooling water, and, b) producing dry superheated stream for plasma gas. A steam plasma induction coupled torch imparts energy to dry superheated steam created in a hollow metal shroud and a water cooling jacket to create steam plasma for the firing of a PERC reactor. Various supply tubes plumb to a water cooling jacket aligned about a steam plasma jet and to a hollow metal shroud located just downstream of a steam plasma jet for production of dry superheated steam. Dry superheated steam is drawn from the water cooling jacket and the hollow metal shroud and injected into the induction steam plasma torch for the creation of a steam plasma heat source. Waste material in a slurry, liquid or gaseous form is injected along with either dry superheated or saturated atomizing steam into an atomizing nozzle for subsequent delivery into a choke throat of the hollow metal shroud for conversion by the steam plasma heat source in a primary and secondary reaction chamber downstream of the steam plasma induction torch. Surplus steam above plasma requirements can be used as atomizing steam for feed slurries, process heat, or for cogeneration of electricity. The heat transfer involved is not unlike that in a boiling water nuclear fission reactor with high heat fluxes into metal cooling tubes in which flowing water is flashed to steam.

There are several reasons which led to the development of the concept of using steam plasma with heat recovery in a waste treatment/conversion application:

The steam reforming reaction requires heat and steam. For many waste streams containing primarily hazardous and/or toxic organic constituents, i.e., compounds containing carbon and hydrogen (but also possibly containing nitrogen, oxygen, chlorine, fluorine, and sulfur), an alternative reaction to excess air oxidation (such as incineration, wet oxidation, supercritical water oxidation) for destruction and conversion, is steam reforming. Steam reforming is the reaction of hydrocarbons ($C_xH_y$) with steam ($H_2O$) in the absence of free oxygen ($O_2$) at high temperature. The general form of the steam reforming reaction for a hydrocarbon containing nitrogen is:

$$C_xH_yN_z + xH_2O \xrightarrow{heat} xCO + (y+2x)/2H_2 + (z/2)N_2.$$

An added benefit of steam reforming is that, since the reaction proceeds in a reducing environment (no free oxygen), nitrogen (N) in the waste stream does not combine with oxygen to form the class of pollutants known as nitrogen oxide compounds ($NO_x$). Thus, costly $NO_x$ abatement technology in an air pollution control system (APCS) downstream of the thermal treatment steps is not needed.

Because both steam and a source of heat such that $T_{heat\ source} \gg T_{reaction}$ are required to conduct the reaction, an ideal source of heat is steam plasma. The plasma state offers the required heat input rate (Btu/h, or kW) and the use of steam as the plasma forming gas offers the necessary chemical reactant ($H_2O$). With steam plasma, the two requirements are combined into a single stream.

An induction steam plasma offers one of the highest theoretical power efficiencies (ratio of power in plasma jet to line power) of any plasma forming gas. This is largely because steam plasma temperatures are significantly lower than for argon or other inert gas temperatures, with the attendant lower radiation heat loss.

Steam is much less costly than other common plasma gases including argon, nitrogen, oxygen, and others. As a raw material for estimating operating costs, water (steam) represents the least costly option for plasma gas ($/lb).

The steam torch/generator combination avoids high heat losses to cooling water. An induction plasma torch operating on steam as the plasma gas with the steam generated from its own heat losses improves overall process energy efficiency and allows a higher throughput rate of material to be processed for a given electrical line power level. A steam/torch/generator avoids a separate source of heat to produce steam from water and the additional costs of electricity or fossil fuels. An induction plasma torch operating as a steam generator produces its own steam requirement from heat that would normally be lost to a high flow rate of cooling water at a low temperature.

According to one embodiment of the present invention, there is provided a steam induction plasma torch, a water cooling jacket surrounding a steam plasma jet, a hollow metal shroud down stream of the steam plasma jet, a cooling water source connected to the water cooling jacket and hollow metal shroud, tubes for the drawing off of dry superheated steam connected to the water cooling jacket and hollow metal shroud for introduction of the dry superheated steam to the induction steam plasma torch, an atomizing nozzle for introduction of waste slurry, liquid or gas into a choke throat, a reactor having at least a primary reaction chamber, an intermediate choke orifice, a secondary reaction chamber and a final choke orifice.

In the PERC process for waste treatment, it is beneficial to take advantage of any "plasma chemical effects" by use of induction plasma. The induction plasma as a high temperature gas heat source delivers high enthalpy into a small volumetric flowrate of gas followed by heat transfer to the waste feed stream. From a chemical process standpoint, the formation of a plasma can be thought of as a "side effect" or consequence of using induction to transfer electric power into a flowing gas stream. Thus a plasma is not required to carry out the chemical reactions but a plasma must be created in order to have a conductor (the gas serving as an "electrode") to transfer the power into the gas. In fact, contacting of a waste stream with the plasma such that the waste constituents are heated to near plasma temperature is not necessary for adequate waste destruction. Heating waste to near plasma temperature is also undesirable from the standpoint of specific energy consumption in kW-h/lb of waste processed. Given that a plasma is produced, there are radiative ("$T^4$") and convective heat losses associated with sustaining a plasma at >6,000° C. in close proximity to a cold wall. The plasma forms inside the induction coil zone because this is the only region where a sufficiently strong oscillating magnetic field exists to sustain the plasma.

The specific chemical flowsheet dictates the optimum plasma gas for reaction compatibility or to serve as a reactant. For steam reforming, steam would appear to be the optimum plasma gas. Argon, an inert gas, should be compatible with any chemical flowsheet and is the easiest gas to ionize, but is costly, and reduces the power efficiency because of its high plasma temperature.

There are minimum sustaining power curves which relate frequency, pressure, plasma gas, torch size and power input. From the standpoint of ionization to produce a plasma, steam most likely behaves as a combination of oxygen and hydrogen, both difficult gases to ionize, largely due to their diatomic nature. For steam to be a viable plasma gas there is a critical operating envelope of power level, frequency, gas flow rate, and torch size. The power supply is selected for the desired combination of output voltage, current, power level and frequency.

Torch heat losses can be reduced by the use of high temperature and/or reflective coatings to reduce heat losses in the plasma zone. The use of sheath gas can also reduce torch heat losses.

The torch, rather than using cooling water, can use thick metal walls surrounding the plasma zone, and operate as a steam generator. Such a process would serve the dual purpose of: a) recovering a potentially substantial fraction of the plasma heat that would normally be lost as low temperature heat to a large flow of cooling water, and b) producing dry superheated steam for plasma gas. Surplus steam above the plasma gas requirements could also be used as atomizing steam for feed slurries, process heat, or for cogeneration of electricity.

The most appropriate chemical flowsheet for a given waste treatment application must be evaluated for each particular waste stream. Steam reforming is not the optimum flowsheet in all situations. Identified alternatives include oxidation, direct thermal decomposition (cracking), and reactions with other reagents. The offgas processing is assessed in conjunction with selection of any chemical flowsheet.

The process of feed introduction into the reactor is of prime importance. For liquids and slurries, fine atomization is the one approach. Reliable feed preparation procedures, thermally stable slurries, and possible cooling of the feed as it enters the reactor are all important processes.

The location of feed introduction with respect to the plasma heat source effects final gas product quality. For hydrocarbon feed materials, intimate mixing with a non-steam plasma may result in cracking of the hydrocarbon to form carbon soot which is characterized by low conversion kinetics because this is a gas/solid reaction (mass transfer limited). The net result is that the reaction chamber design gas residence time may not be sufficient to convert the carbon to carbon monoxide. In such situations, soot removal downstream would be required. Adequate steam concentration in the high temperature zone would help avoid soot formation.

High initial turbulence for good mixing and mass and heat transfer in the primary reaction chamber can be one approach. The variables of turbulence are gas flowrate, reactor size (volume), and feed introduction method and location.

Total gas flowrate through the reactor can be increased by increasing the plasma gas flowrate, introducing a separate gas stream, increasing the feed atomization medium flowrate, and recycling offgas back to the primary reactor. Increasing the gas flowrate reduces the average gas residence time in both the primary and secondary reactor. It also increases the heat load on the plasma and increases the specific energy requirement (SER) in kW-h/lb of waste processed, also increasing operating costs.

Reducing the primary reactor volume at a given total gas flowrate also increases turbulence. The volume can only be reduced so much. The diameter must be somewhat larger than the plasma torch gas exit diameter. If the primary reactor refractory inside wall is too close to the plasma flame, melting of the refractory may become a concern.

The process and location of atomized feed introduction should effect turbulence to some extent. For example, the feed can be introduced a) radially across the reactor centerline, b) axially, i.e., down the length of the primary reactor either cocurrent or countercurrent with the plasma gas, and c) tangentially to create a swirl pattern. The operational impacts of any of these approaches include impingement of feed on refractory and subsequent refractory spalling, and the effect on torch operation to the point of torch surface fouling and even extinguishment. In small reactor volumes impingement of feed on refractor cannot be avoided but use of appropriate refractory will protect the reactor walls. Feed injection into a flow restriction orifice provides for high initial turbulence.

The current primary reaction chamber functions as an ideal continuous stirred tank reactor (CSTR), a term familiar to chemical engineers. The degree of backmixing in the primary reaction chamber should be high which relates to initial turbulence. One process of enhancing backmixing is to provide a restriction or "choke" between the primary and secondary reactor. The degree of back mixing will be higher for a sharp-edged orifice than for a smooth transition from the primary reactor into the restriction.

The PERC process is based on the primary reactor being a CSTR and the secondary reaction chamber being a plug flow reactor (PFR). The process is that reactants should be well mixed in the primary reaction chamber and a guaranteed constant residence time should be achieved for all reactants in the PFR secondary reaction chamber. PFRs are characterized by a very narrow (approaching uniform) residence time distribution. The higher the length-to-diameter (L/D) ratio for the secondary reaction chamber, the more uniform the residence time distribution. The secondary reaction chamber can have an L/D ratio of 5 to 50.

One significant aspect and feature of the present invention is a PERC reactor incorporating an induction steam plasma heat torch.

Another significant aspect and feature of the present invention is the incorporation of an induction steam plasma torch for the creation of steam plasma.

Yet another significant aspect and feature of the present invention is the use of water introduced into a water jacket surrounding a steam plasma jet to create dry superheated steam.

Still another significant aspect and feature of the present invention is water introduced into a hollow metal shroud downstream of the stream plasma jet to create dry superheated steam.

A further significant aspect and feature of the present invention is the use of dry superheated or saturated steam to atomize or otherwise mix slurried waste, liquid waste or gaseous materials for conversion in a reactor.

Having thus described embodiments of the present invention, it is the primary objective hereof to provide an induction steam plasma reactor with a steam plasma torch for conversion of waste materials.

One object of the present invention is to provide a plasma energy recycle and conversion (PERC) reactor.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 3A–D illustrate cross sectional views of steam generator tubes/radiation shields for a steam plasma torch wherein:

FIG. 3A illustrates quadrilaterals with interspersed ceramic rods;

FIG. 3B illustrates truncated wedges with interspersed ceramic rods;

FIG. 3C illustrates chevrons;

FIG. 3D illustrates staggered circular tubes;

DESCRIPTION OF THE PREFERRED EMBODIMENTS

Figure 1:
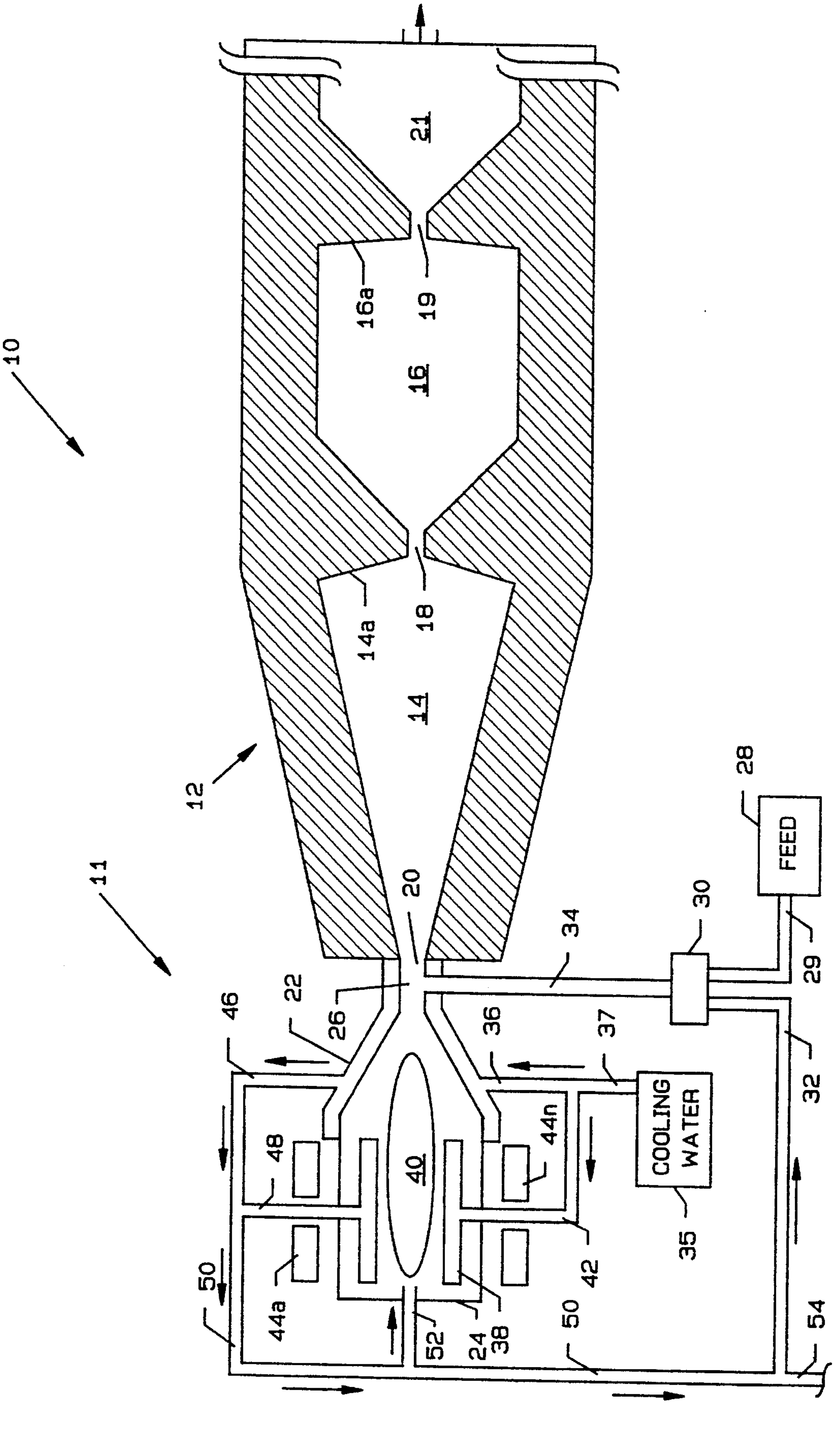
FIG. 1 illustrates an overview of an induction steam plasma reactor.

FIG. 1 illustrates an overview of an induction steam plasma reactor 10 for destruction and conversion of waste liquids and slurries and the like having a steam plasma torch 11 and a reactor 12. A reactor 12 having a primary reaction chamber 14, a secondary reaction chamber 16, a choke orifice 18 therebetween, a secondary choke orifice 19 downstream of the secondary reaction chamber 16, a tertiary reaction chamber 21, and an inlet choke orifice 20 aligns to a hollow conical metal shroud 22 on the induction steam plasma torch 11. The downstream walls **14*a* and 16*a* of primary and secondary reaction chambers 14 and 16 are angled about 30°–45° with reference to the vertical to promote adequate mixing prior to passage through the primary and secondary choke orifices 18 and 19**.

The steam plasma torch 11 includes shrouding and connecting piping essential to the operation of the steam plasma torch 11. The metal shroud 22 converges to form a venturi or choke throat 26. A feed slurry supply 28 connects by a feed slurry supply tube 29 to a two fluid atomizing nozzle 30 as does a steam supply tube 32 which delivers dry superheated or saturated steam for atomization of the feed slurry. Atomized feed slurry is delivered to the choke throat 26 by slurry feed supply tube 34 for mixing and conversion. Cooling water from a cooling water supply source 35 is delivered to the hollow metal shroud 22 by cold water supply tube 36 and also to a plasma shield 38 in the form of a water cooling jacket surrounding a steam plasma jet 40 by cooling water supply tube 42. Induction coils **44*a*–44*n* couple electromagnetic energy to the steam plasma jet 40 through a ceramic or quartz gas enclosure 24 to sustain the steam plasma jet 40. Water in the hollow metal shroud 22 and the water jacket plasma shield 38 is superheated to dry steam by the thermal energy provided by the steam plasma jet 40. This superheated steam is drawn off of the hollow metal shroud 22 by a tube 46 and drawn off of the water cooling jacket plasma shield 38 by a tube 48 for reintroduction into the upstream zone of the steam plasma jet 40 of the induction steam plasma torch 11 via tubes 50 and 52. Superheated or saturated steam is introduced into the steam supply tube 32 for slurry atomization purposes. Excess steam is drawn off the lower end of tube 50** for other various uses.

MODE OF OPERATION

An induction plasma torch using steam as the plasma forming gas with heat recovery by steam generation coupled to a liquid/slurry processing reactor is now described with a description of the operation of torch/reactor combination.

Torch/Steam Generator

The predominant contribution to total heat loss in an induction plasma torch is a result of radiant heat transfer to cooled walls surrounding and in close proximity to the plasma (energy input) zone. The plasma zone 40 is the internal volume of the torch adjacent to the induction coils **44*a*, 44*n* and in which the highest temperatures are achieved. Traditionally, the non-electrically conducting (typically ceramic or quartz glass) torch enclosure 24 has been protected from radiant heat either by 1) cooling water flowing in direct contact with the outside of the torch enclosure 24, or by 2) positioning a series of plasma shield segments between the plasma zone and the torch enclosure 24 in a circular array. Various plasma shield designs such as the water jacket plasma shield 38** or others have previously been described in U.S. Pat. No. 4,431,901, some of which are applicable to the present concept of using the shields as steam generators.

Makeup cooling water 35 which could be preheated by other means or by first flowing through the hollow metal steam generator cone or shroud 22 is pumped through the plasma shields or steam generator water jacket plasma shield tubes 38 where it is vaporized by the heat radiating from the plasma in the radial direction. The generated steam is collected in tubes 46, 48, and 50 which are combined and reentered to more than one destination: to the plasma torch to be used as plasma forming gas through steam tube 52, to the two-fluid steam atomized feed slurry spray nozzle 30 and any excess steam generated 52 would be routed to other applications such as preheating feed, reheating reactor off-gas downstream of an emission control system, etc.

Liquid/Slurry Feed and Reaction Chambers

Figure 5:
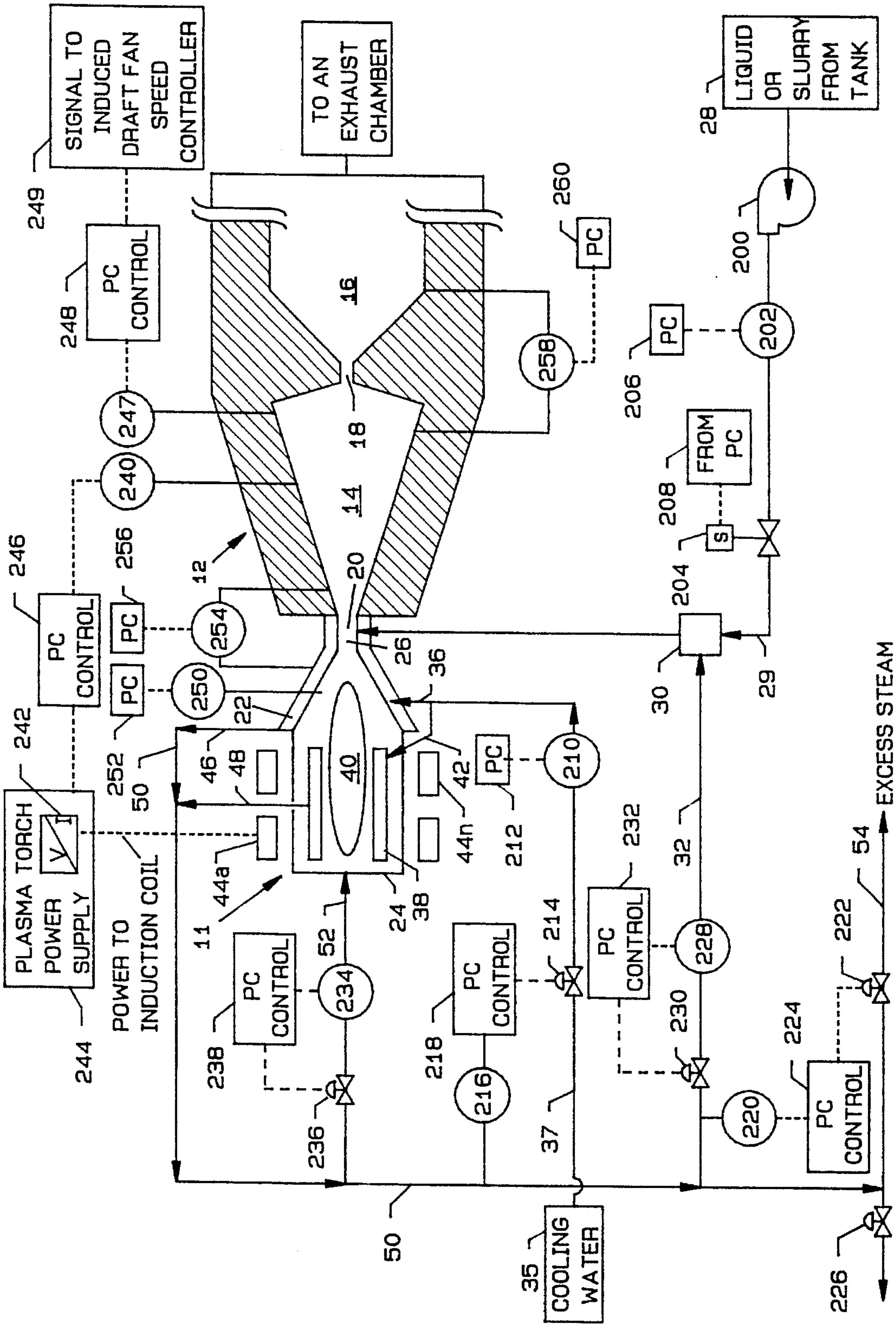

Liquid or slurry waste from the feed slurry supply 28 is metered by a positive displacement pump 205 as illustrated in FIG. 5 to the two-fluid atomizing spray nozzle 30 where the material is dispersed into fine droplets and injected into the first venturi throat or choke 26, where it is contacted by and intimately mixed with the steam plasma jet 40 exiting the induction plasma torch 11. The venturi throat 26 allows for high gas velocity (up to 500 ft/sec., and Reynolds numbers up to 30,000), and hence high turbulence to provide intimate mixing of the reactants—steam and introduced slurry or liquid feed material. The initially well-mixed reactant mixture is allowed to further backmix for additional dwell time in a constant stirred tank reactor (CSTR) called the primary reaction chamber (PRC) 14. A second venturi throat or choke 18 provides backmixing in the PRC. A relatively flat (roughly 10°) discharge end slope of the PRC allows for good backmixing. A long converging slope would allow too streamlined a flow and not provide the degree of backmixing required, hence the flat slope. The gas exiting this second choke 18 enters into either another CSTR or into a secondary reaction chamber (plug flow reactor) 16 depending on the degree of chemical conversion required. For higher conversion, an additional CSTR followed by a PFR would be used. For moderate conversion, a PFR following the first and only CSTR would be used. The PFR is a long refractory-lined reaction chamber whose purpose is to guarantee a desired residence time for all elements of fluid with minimal axial dispersion or backmixing of gas. The residence time distribution in a PFR should be as narrow as possible. Backmixing in a PFR results in reduced chemical conversion, and hence, is undesirable.

AN INDUCTION STEAM PLASMA TORCH WITH HEAT RECOVERY BY STEAM GENERATION

Figure 2:
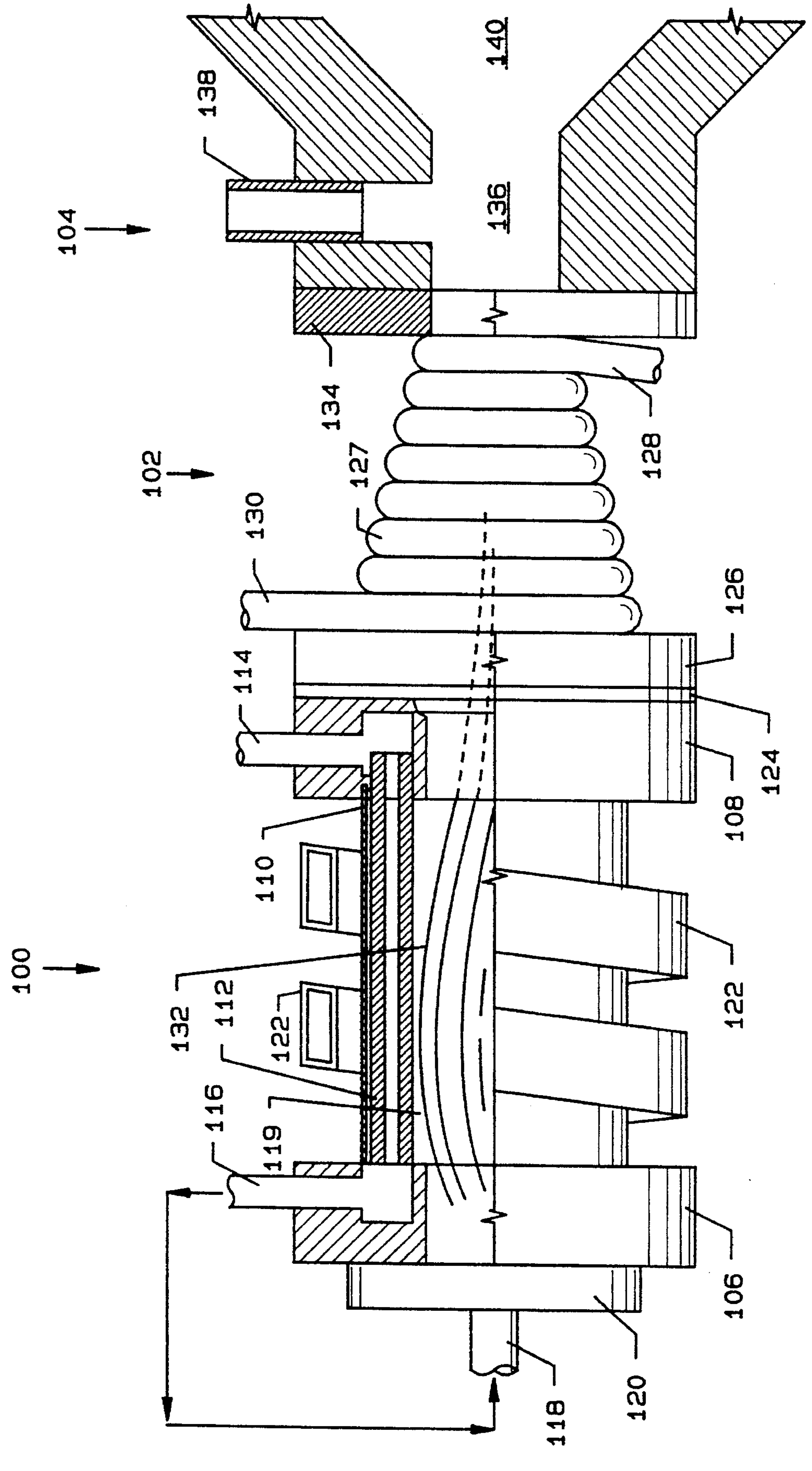
FIG. 2 illustrates a cross sectional view of an induction steam plasma torch with heat recovery by steam generation.

FIG. 2 illustrates an induction steam plasma torch 100, a converging steam generator cone 102 and a reactor 104 in aligned combination.

The induction steam plasma torch 100 is generally based upon the induction steam plasma torch 11 illustrated in FIG. 1 and includes opposing circular end members 106 and 108, a tubular non-electrically conducting ceramic or quartz gas enclosure 110 in sealed alignment between the circular end members 106 and 108, one or more steam generator tubes/radiation shields 112 preferably aligned about the induction steam plasma torch centerline, an inlet member 114 and an outlet member 116 in plumbed connection with one or more steam generator tubes/radiation shields 112, a superheated steam supply tube 118 aligned and secured to the circular end member 106 by a plate 120, an induction coil 122 aligned about the gas enclosure 110 and steam generator tubes/radiation shields 112, and a ceramic insulating gasket 124 and cone/torch attachment flange 126 aligned to the circular end member 108 as illustrated.

The converging steam generator cone 102 is positioned as and performs a function not unlike that of the hollow metal shroud 22 illustrated in FIG. 1. The converging steam cone generator 102 is of wrapped and welded heavywall tubing whose purpose, if used with the induction steam plasma torch 100, is to recover heat down stream of a steam plasma torch jet 132 created in the induction steam plasma torch 100. The converging steam generator cone 102 includes a wound tube 127, an inlet 128 and an outlet 130. Water, which may be preheated, is introduced into the inlet 128 and is heated by the steam plasma torch jet 132 to exit the outlet 130 as pressurized water or steam and is utilized elsewhere or is plumbed in series fashion to the inlet member 114 of the induction steam plasma torch 100 where further heating occurs to produce or elevate the temperature of the steam (or water) as it passes through the steam generator tubes/radiation shields 112 for additional heating in close proximity to the steam plasma torch jet 132. Super heated steam leaving the outlet member 116 is introduced into the super heated steam supply tube 118 to enter the interior torch chamber 119 where the steam plasma torch jet 132 is generated by action of oscillating current flowing in the induction coil 122.

The converging steam generator cone 102 aligns to the reactor 104 and is similar in concept to the reactor 12 illustrated in FIG. 1. Illustrated components of the reactor 104 include a metal attachment flange 134, a venturi throat or choke 136, a liquid or slurry supply tube 138 and a primary reaction chamber 140.

The system drawn in FIG. 2 represents an induction steam plasma torch/reactor combination for treating liquids and slurries. The induction steam plasma torch 100 makes its own plasma gas (steam) and simultaneously recovers heat that would normally be lost in the system of FIG. 2 minus the steam generator cone 102 and reactor 104. In the context of processing liquids and slurries, then the entire FIG. 2 applies. The following discussion of the applications of FIG. 2 does not include the steam generator cone 102.

The induction steam plasma torch 100 alone, as described, but without the converging steam generator cone 102, can be used as a heat source in other reactor configurations (rotary kiln, fixed hearth, fluidized bed, cupola furnace, etc.) for treating materials or wastes in other physical forms such as solids (heterogeneous, homogeneous), particularly where steam reforming is desired.

There are several options for transferring the heat normally lost by radiant heat transmission to steam for use in the plasma and elsewhere. Each of these methods are an option to keep the present invention versatile. The options identified are: 1) boiling water in the shield tubes (steam generator tubes) which offers very high heat transfer coefficients and rates, 2) pumping pressurized heated water through the shield tubes followed by flashing to steam and superheating in external equipment, or 3) by circulating a different heat transfer fluid (as a secondary heat exchange loop) with or without phase change through the shield tubes for boiling water in a separate heat exchanger to make steam.

The choice of plasma shields/steam generator tubes of FIGS. 3A–3D, i.e. quadrilateral, chevron, truncated wedge, staggered circular tube, etc., should remain flexible. There are most likely other applicable designs including extended surfaces, etc. The basic requirements are that it must: 1) withstand the internal fluid pressure, 2) provide high heat transfer rates, and 3) serve as a shield in that it forms a line of sight barrier to protect the gas enclosure 110 from ultraviolet (UV) and infrared (IR) radiation emitted from the plasma. In addition, the plasma shields/steam generator tubes must be segmented and not continuously surround the plasma gas, otherwise an oscillating magnetic field and plasma cannot be produced inside the plasma shields/steam generator tubes.

The number of turns and the cross sectional shape of the induction coil are variable.

The exact arrangement of pressurized water/steam inlet and outlet manifolds in the torch front and back ends are variable.

Figure 4:
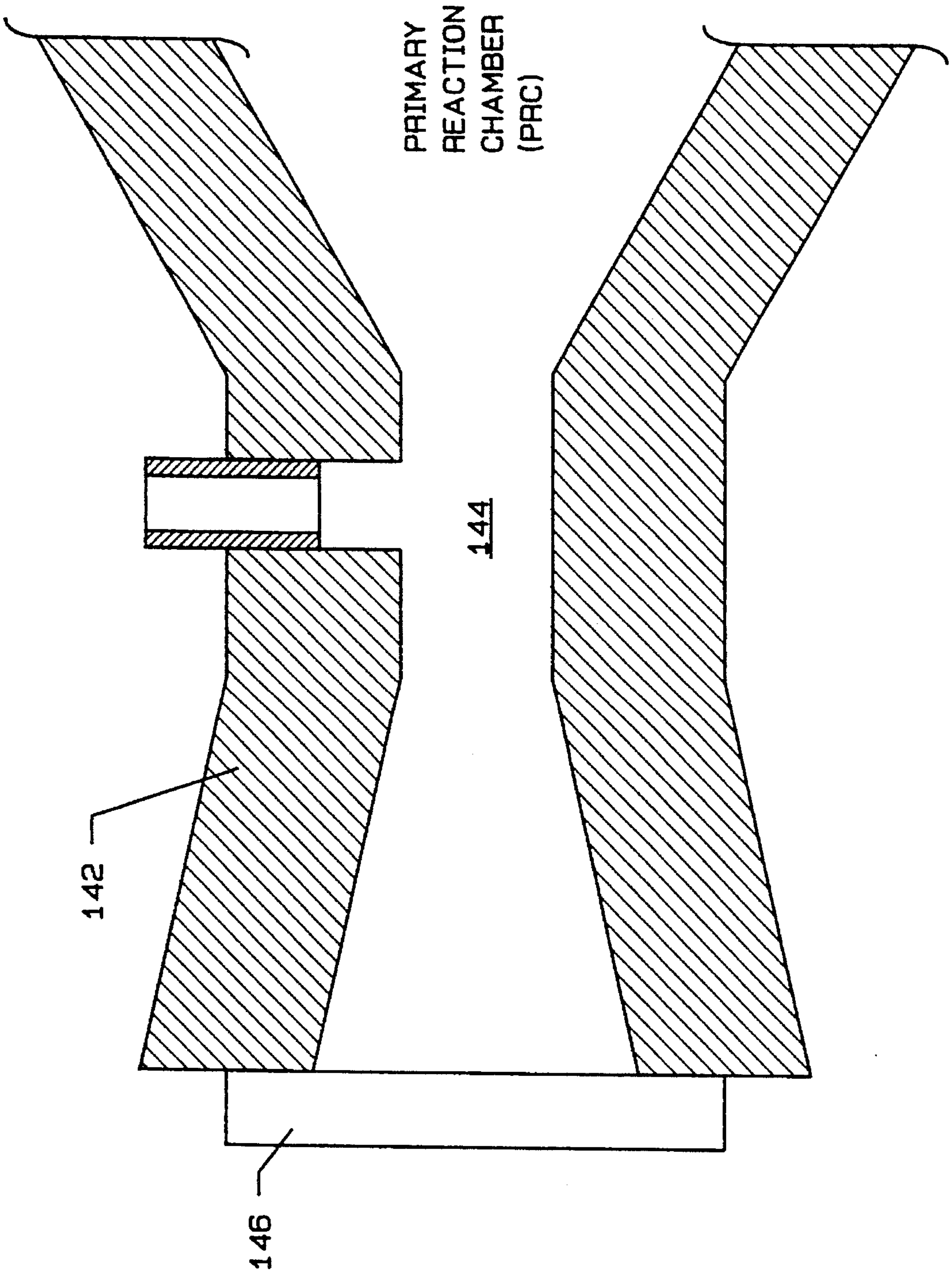
FIG. 4 illustrates a cross sectional view having a converging transition about the feedpoint in the choke; and, FIG. 5 illustrates a process and instrumentation diagram for the induction plasma steam torch.

The use of the converging steam generator cone 102 is an option to maximize flexibility, hence the two approaches of the converging steam generator cone 102 of FIG. 2 and a refractory-lined cone having no heat recovery and a higher gas temperature of FIG. 4, which is used in adjacent alignment to the cone/torch attachment flange 126. When using the converging steam generator cone 102 of FIG. 2, the temperature of the plasma gas jet 132 exiting the torch section 100 and entering the venturi throat 144 of the refractory-lined cone 142 will be reduced due to heat loss to the metal walls of the converging refractory lined cone 142 of FIG. 4. In some liquid/slurry processing applications, where it is most desirable to maintain as high a temperature as possible in the gas entering the venturi throat, a refractory-lined cone or transition piece (FIG. 4) should be considered, if feasible.

The design of the converging steam generator cone 102 is variable. FIG. 2 illustrates an option which consists of a tube 127 of circular cross section capable of withstanding steam pressure, and wrapped to form the cone. Another option is two metal cones, one inside the other and welded up with stiffeners to hold the steam pressure as conceptually visualized as the hollow metal shroud 22 in FIG. 1. The space between the cones would be the steam flow channel.

FIG. 3A–3D illustrates the cross-sectional views of the options for the steam generator tubes/radiation shields such as shield 112 for use in induction steam plasma torches where all numerals correspond to those elements previously described. Each option is illustrated in coaxial alignment with the non-conducting ceramic, quartz gas enclosure 110 of FIG. 2. Each option requires that the shields be segmented and not form a continuous electrically conducting shield around the plasma zone.

Figure 3A:
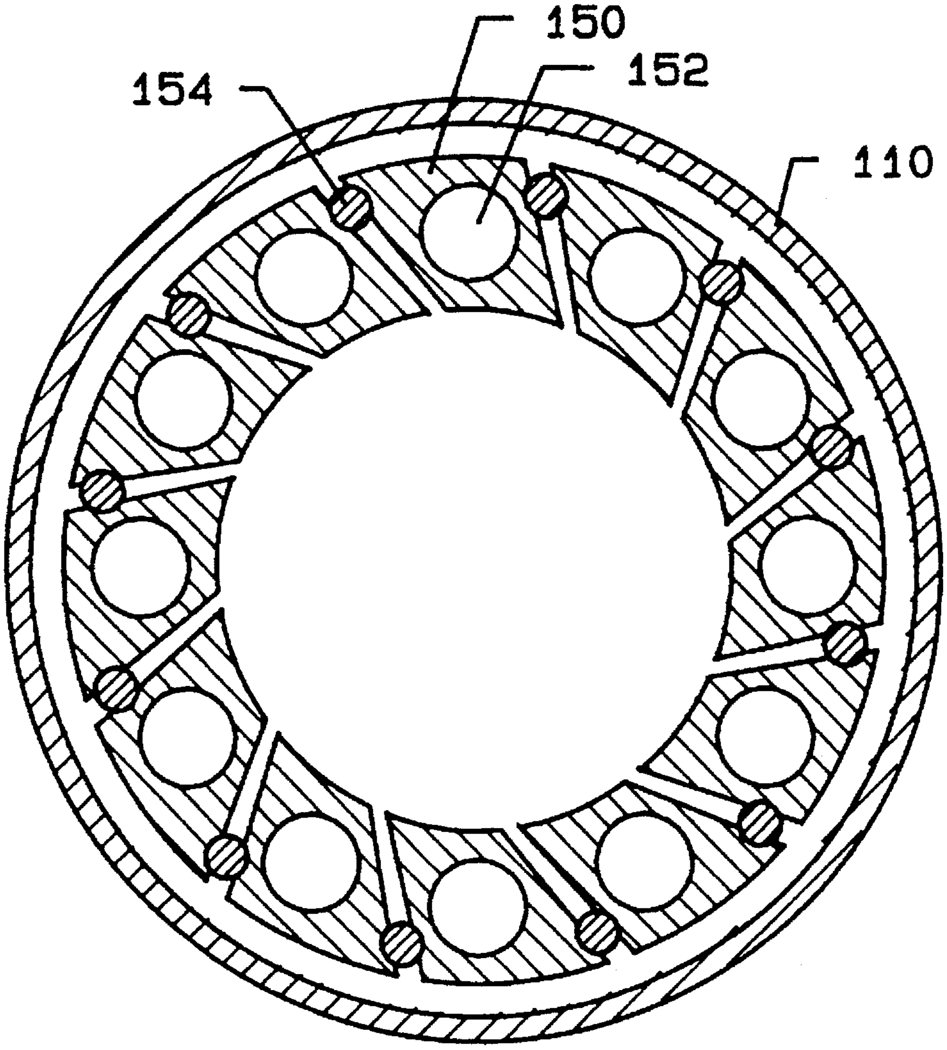

FIG. 3A illustrates a plurality of quadrilateral-shaped steam generator tube/radiation shields 150 having a central fluid passage 152 for the carriage of steam aligned therein. A plurality of ceramic rods 154 are interspersed between and contacting the adjacent pluralities of quadrilaterally-shaped steam generator tube/radiation shields 150 to protect the gas enclosure 110 from ultra violet (UV) and infrared (IR) radiation emitted from the plasma.

Figure 3B:
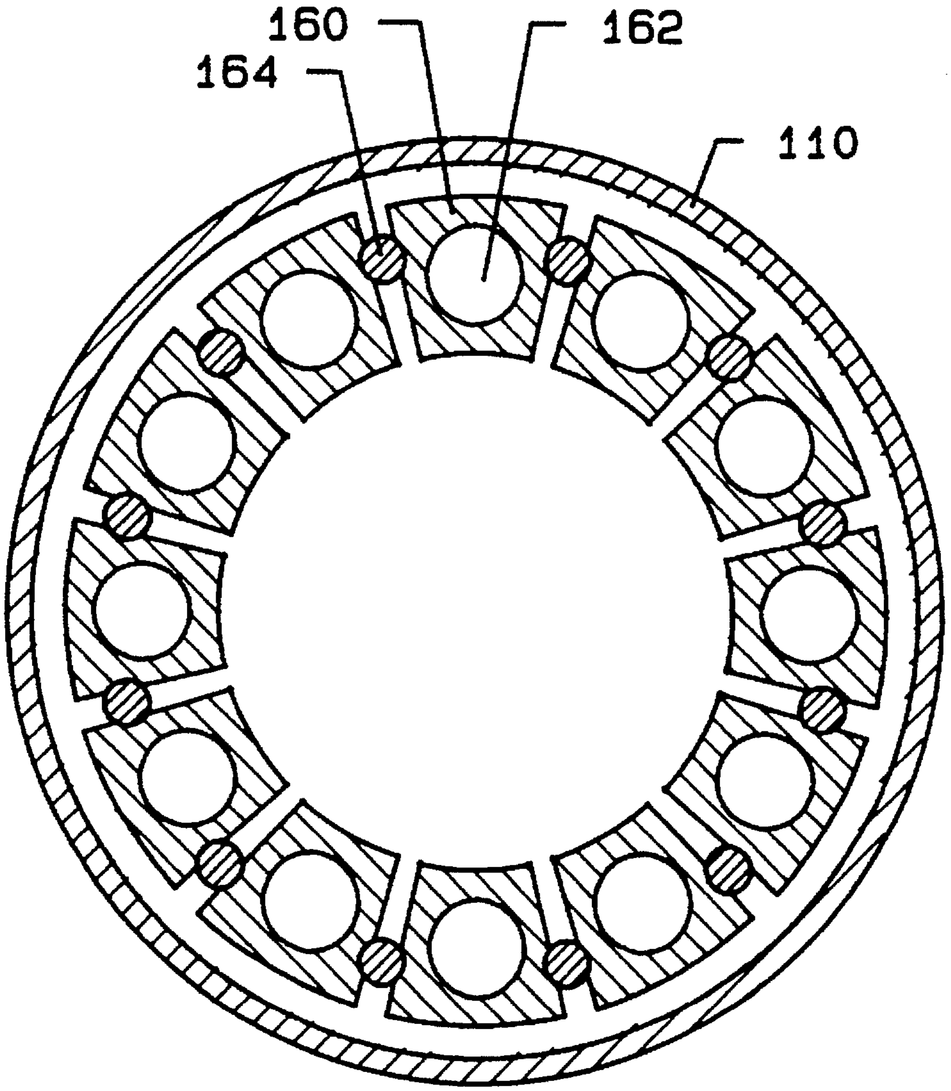

FIG. 3B illustrates a plurality of truncated wedge steam generator tube/radiation shields 160 having a central fluid passage 162 for the carriage of steam aligned therein. A plurality of ceramic rods 164 are sealingly interspersed between the pluralities of truncated wedge steam generator tube/radiation shields 160 to protect the gas enclosure 110 from ultraviolet (UV) and infrared (IR) radiation emitted from the plasma.

Figure 3C:
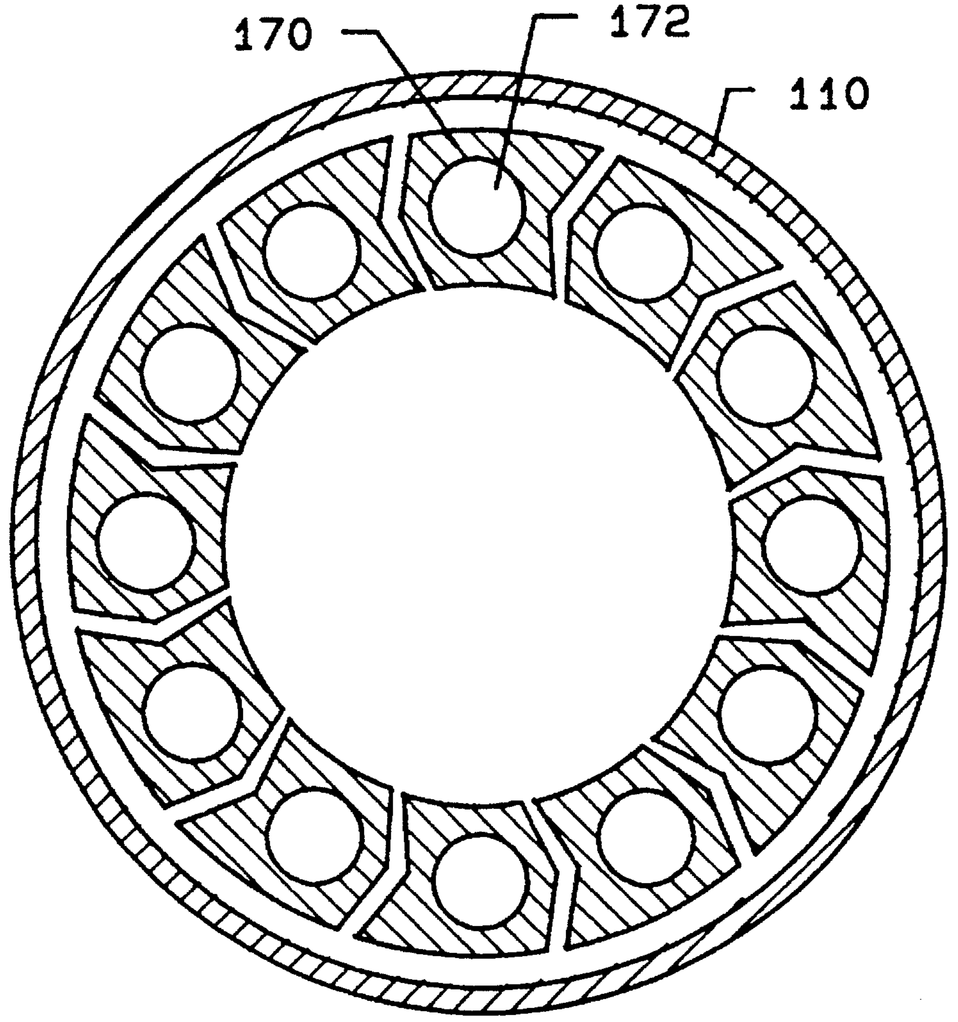

FIG. 3C illustrates a plurality of chevron-shaped steam generator tube/radiation shields 170 having a central fluid passage 172 for the carriage of steam aligned therein. A line of sight seal between the male and female chevron members is provided without the use of interspersed ceramic rods. The plurality chevron-shaped shields 170 protect the gas enclosure 110 from ultraviolet (UV) and infrared (IR) radiation emitted from the plasma.

Figure 3D:
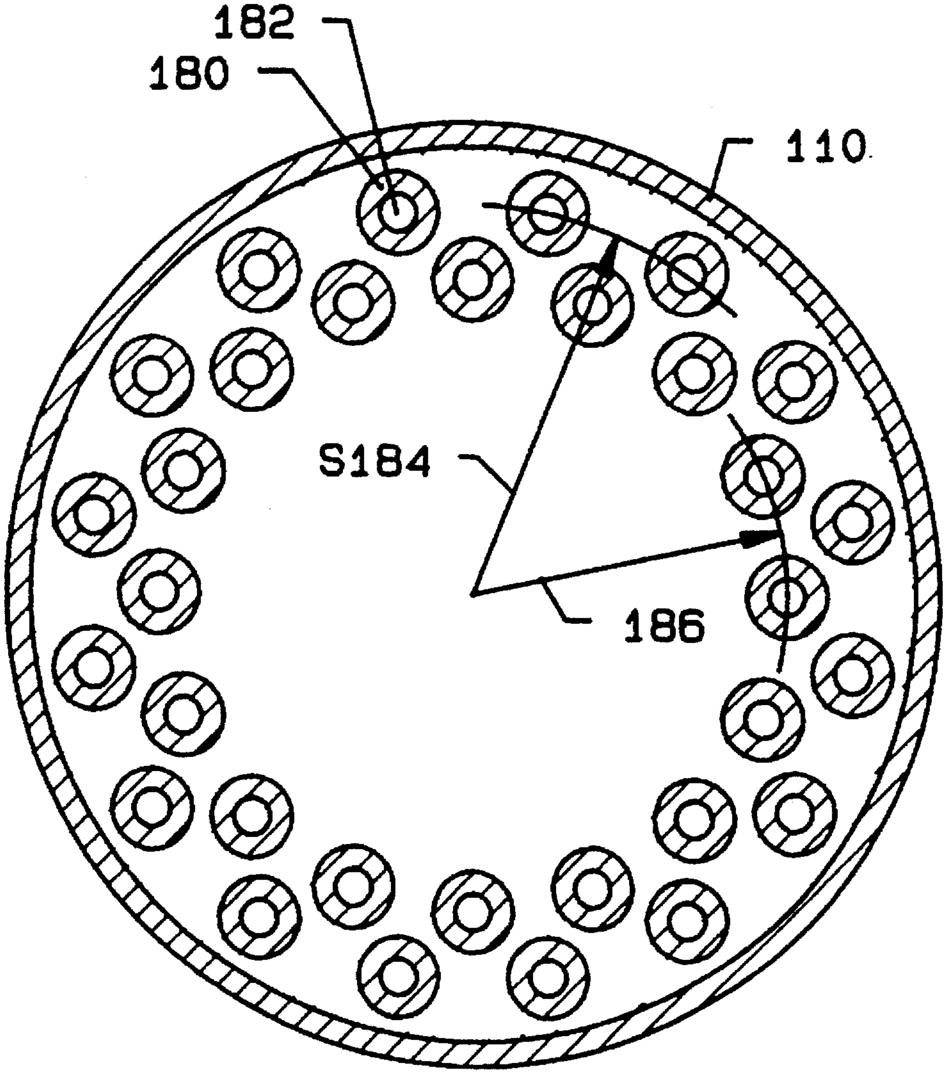

FIG. 3D illustrates a plurality of staggered circular steam generator tubes 180 having fluid passages 182 arranged about a major outer radius 184 and a minor radius 186 to provide a radiation shield to protect the gas enclosure 110 from the ultraviolet (UV) and infrared (IR) radiation emitted from the plasma. The steam generator tubes are provided in sufficient quantity to form a radial line of sight seal so that no light can pass directly in an outward direction.

FIG. 4 illustrates a converging refractory-lined cone 142 being of integral construction with and in alignment with the venturi throat or choke previously referenced where no heat recovery is required and where a higher gas temperature is desired for operational considerations. The converging refractory-lined cone 142 aligns to the venturi throat or choke 144 which is similar to the venturi throat or choke 136 described previously with respect to FIG. 2 and with regard to a downstream reactor. A cone/torch attachment flange 146 is also illustrated for attachment such as to the induction steam plasma torch 100 illustrated in FIG. 2.

The venturi or choke throat 144 is made of refractory material rather than metal because of the harsh abrasive environment that would be expected in the throat where the feed liquid/slurry is being introduced by atomization into a high velocity, high temperature gas stream.

FIG. 5 illustrates the process and instrumentation diagram for an induction plasma torch 11 using steam as the plasma forming gas after start up with argon or other suitable gas with heat recovery by steam generation coupled to a liquid/slurry processing reactor 12 where all numerals correspond to those elements previously described.

Liquid or slurry from feed slurry tank 28 is metered by a variable speed feed pump 200 to the inlet venturi throat (choke) 20 and monitored by a flow transmitter 202 connected to a PC input 206. Certain input conditions delivered to various PC inputs such as chamber overtemperature, undertemperature, loss of power, loss of atomizing steam pressure, etc. would result in waste feed shutoff by the shutoff valve 204 and serve as a safety interlock as controlled by a PC output 208. Liquid or slurry is pumped by the feed pump 200 through the feed slurry supply tube 29 to the two fluid atomizing spray nozzles 30.

Cooling water from the cooling water supply source 35 for steam generation is fed into the water cooling jacket or radiation shield/steam generator tube 38 and hollow metal shroud 22 by supply tubes 36, 37 and 42. Its flow is measured by flow transmitter 210, connected to PC input 212 and the flow of water is controlled by temperature control valve 214 which gets a signal from temperature transmitter 216 via PC control block 218 which senses the steam temperature. At a steam temperature set point, if the steam temperature increases, it will call for more water to lower the temperature back to the set point.

The steam pressure is measured by pressure transmitter 220 and is controlled by pressure control valve 222 each connected to the PC control block 224. Pressure control valve 226 serves as a pressure relief valve if more steam discharge capacity is required to control steam pressure in the system. Atomizing steam flowrate is measured by flow transmitter 228 and controlled by flow control valve 230 each connected to PC control block 232. Plasma forming steam flowrate is measured by flow transmitter 234 and controlled by flow control valve 236 each connected to PC control block 238. Primary chamber temperature is measured by temperature transmitter 240 and controlled by a potentiometer in a current to voltage converter 242 in the plasma torch power supply 244 to regulate the amount of voltage and/or current supplied to the induction coils 44*a*–44*n* on the induction steam plasma torch 11. The temperature transmitter 240 and current to voltage inverter 242 connect to PC control block 246 to act as a temperature control loop. The primary chamber pressure is measured by pressure transmitter 247 and controlled by a signal from the PC control 248 block to a damper valve or a speed controller 249 on an induced draft fan downstream of the emission control system. Plasma gas jet/steam generator cone 22 temperature is measured by temperature transmitter 250 which connects to PC input 252. The differential pressure across the inlet choke orifice 20 is monitored by pressure differential transmitter 254 which connects to PC input 256. The differential pressure across the choke orifice 18 is monitored by pressure differential transmitter 258 which connects to PC input 260.

Various modifications can be made to the present invention without departing from the apparent scope hereof.

APPENDIX

STEAM PLASMA REACTOR

PARTS LIST

10 induction steam plasma reactor
11 induction steam plasma torch
12 reactor
14*a* primary reaction chamber
14 angled wall
16 secondary reaction chamber (plug flow)
16*a* angled wall
18 choke orifice
19 secondary choke orifice
20 inlet choke orifice
21 tertiary reaction chamber
22 hollow metal shroud
24 ceramic or quartz torch enclosure
26 venturi or choke throat
28 feed slurry supply
29 feed slurry supply tube
30 atomizing spray nozzle
32 steam supply tube
34 supply tube feed slurry/atomization media supply tube
35 cooling water supply
36 cold water supply tube
37 supply tube
38 water cooling jacket or radiation shield/steam generator tube
40 steam plasma jet
42 cooling water supply tube
44*a*—44*a* induction coil
46 tube
48 tube
50 tube
52 tube (steam supply tube to plasma)
54 excess steam
100 induction steam plasma torch
103 converging steam generator cone
104 reactor
106 circular end member
108 circular end member
110 gas enclosure
112 steam generator tubes/radiation shields
114 inlet member
116 outlet member
118 superheated steam supply tube
119 interior torch chamber
120 plate
122 induction coil
124 ceramic insulating gasket
126 cone/torch attachment flange
127 tube
128 inlet
130 outlet
132 steam plasma torch jet
134 attachment flange
136 venturi or choke throat
138 liq./slurry supply tube
140 primary reaction chamber
142 refractory lined cone
144 venturi or choke throat
146 cone/torch attachment flange
150 pl. of quadrilateral steam generator tube/radiation shields
152 central fluid passage
154 ceramic rods or round bars
160 pl. of wedge-shaped steam generator tube/radiation shields
162 central fluid passage
164 ceramic rods or round bars
170 pl. of chevron-shaped steam generator tube/radiation shields
172 central fluid passage
180 staggered steam generator tubes
182 fluid passage
184 major radius
186 minor radius
200 feed pump
202 flow transmitter
204 shutoff valve
206 PC input
208 PC output
210 flow transmitter
212 PC input
214 temp. control valve
216 temp transmitter
218 PC control block
220 pressure transmitter
222 pressure control valve
224 PC control block
226 pressure control valve
228 flow transmitter
230 flow control valve
232 PC control block
234 flow transmitter
236 flow control valve
238 PC control block
240 temperature transmitter
242 current to voltage inverter
244 plasma torch power supply
246 PC control block
247 pressure transmitter
248 PC control block
249 signal to speed control
250 temp. transmitter
252 PC input
254 press. diff. transmitter
256 PC input
258 press. diff. transmitter
260 PC input

I claim:

1. An induction steam plasma torch for generating a steam plasma comprising:

a. an induction coil means including a power supply means connected to said induction coil means;

b. steam generator tubes/radiation shields means positioned interior of said induction coil means;

c. gas enclosure means positioned between said induction coil means and said steam generator tubes/radiation tube means;

d. a steam supply tube centrally positioned at an inlet end of said gas enclosure means; and, e. means for starting and maintaining an inductively coupled steam plasma.

2. The torch of claim 1 including means for passing water through said steam generator tubes/radiation shield means for generating steam for said steam plasma.

3. The torch of claim 1 wherein said steam generation tubes/radiation shields means is quadrilaterals with interspersed ceramic rod means.

4. The torch of claim 1 wherein said steam generation tubes/radiation shields means is truncated wedges with interspersed ceramic rod means.

5. The torch of claim 1 wherein said steam generation tubes/radiation shields means is chevron means.

6. The torch of claim 1 wherein said steam generation tubes/radiation shields means is staggered circular tube means.

7. The torch of claim 1 including connected together in order at an outlet end of said steam generator tubes/radiation shields means, a circular end member, an induction steam plasma torch, a ceramic insulating gasket, a cone attachment flange, and a converging steam generator cone for generating steam for said steam plasma.

8. An induction steam plasma reactor comprising:

a. an induction coil means including a power supply means;

b. steam generator tubes/radiation shields means positioned interior of said induction coil means;

c. gas enclosure means positioned between said induction coil means and said steam generator tubes/radiation tube means;

d. a steam supply tube centrally positioned at an inlet end of said gas enclosure means;

e. at an outlet end of said gas enclosure means, in order, a circular end member means, at least one flange means, and a reactor means; and, f. means for starting and maintaining said steam plasma which is inductively coupled.

9. The reactor of claim 8 including a converging steam generator cone between flange means of said circular end members means and said reactor means.

10. The reactor of claim 8 including a primary reaction chamber followed by a secondary reaction chamber.

11. The reactor of claim 10 including a venturi or the flow restriction orifice at end entrance of said primary reaction chamber.

12. The reactor of claim 11 including a supply tube connected to said flow restriction orifice or venturi for introducing a feed slurry into said supply tube.

13. The reactor of claim 10 including a converging transition means between said primary reaction chamber and said secondary reaction chamber.

14. The reactor of claim 12 wherein said feed slurry can be selected from a group consisting of:

a. radioactive materials;

b. energetic materials;

c. solid rocket propellant materials;

d. liquid rocket fuel;

e. chemical agents including nerve gas;

f. industrial materials including paint sludge;

g. medical waste;

h. any waste materials in general; and, i. hazardous chemical waste.

15. The process for conversion and disposal of waste with a steam plasma reactor comprising the steps of:

a. generating and maintaining an inductively coupled steam plasma in a steam plasma torch;

b. maintaining and directing said plasma towards a reactor; and, c. introducing a feed slurry into said reactor whereby said plasma converts and disposes of said waste slurry.

16. The process of claim 15 including the step of converting and disposing of said feed slurry of said reactor wherein said reactor includes a primary reaction chamber connected to a secondary reaction chamber.

17. The process of claim 15 comprising the steps of a. starting said plasma with argon;

b. adding steam to said argon; and, c. turning off said argon when said steam plasma is maintained.

18. The process of claim 15 generating steam by passing water through a steam generator tubes/radiation shield means positioned within a coil of said steam plasma torch.

19. The process of claim 16 including the step of generating steam by passing water through a converging steam generator tube between said steam plasma torch and said reactor.

20. The process of claim 15 wherein said feed slurry can be selected from a group consisting of:

a. radioactive materials;

b. energetic materials;

c. solid rocket propellant materials;

d. liquid rocket fuel;

e. chemical agents including nerve gas;

f. industrial materials including paint sludge;

g. any waste materials in general;

h. hazardous chemical waste; and, i. hazardous chemical waste.

* * * * *